United States Patent
Akahane et al.

[11] Patent Number: 5,259,470
[45] Date of Patent: Nov. 9, 1993

[54] STEERING CONTROL FOR A HYDRAULICALLY DRIVEN CRAWLER VEHICLE

[75] Inventors: Fumihiro Akahane; Makoto Yanagisawa, both of Sagamihara, Japan

[73] Assignee: Mitsubishi Jukugyo Kabushiki Kaisha, Tokyo, Japan

[21] Appl. No.: 831,024

[22] Filed: Feb. 4, 1992

[30] Foreign Application Priority Data

Feb. 8, 1991 [JP] Japan .................................. 3-017890
Sep. 6, 1991 [JP] Japan .................................. 3-227326

[51] Int. Cl.$^5$ ............................................. B62D 11/02
[52] U.S. Cl. .................................. 180/6.34; 180/6.24; 180/6.3; 180/6.48
[58] Field of Search ................... 180/6.48, 6.34, 6.3, 180/6.24, 6.7, 6.44, 9.44, 6.28, 6.2

[56] References Cited

U.S. PATENT DOCUMENTS

| | | | |
|---|---|---|---|
| 3,789,940 | 2/1974 | Burton | 180/6.48 |
| 3,917,014 | 11/1975 | Ward | 180/6.48 |
| 3,971,453 | 7/1976 | Patton et al. | 180/6.48 |
| 4,076,090 | 2/1978 | Krusche et al. | 180/6.48 |
| 4,395,878 | 8/1983 | Morita et al. | 180/6.48 X |
| 4,457,387 | 7/1984 | Taylor | 180/6.48 |
| 4,914,592 | 4/1990 | Callahan et al. | 180/6.48 X |

FOREIGN PATENT DOCUMENTS 2434514 1/1976 Fed. Rep. of Germany ..... 180/6.48

*Primary Examiner*—Margaret A. Focarino
*Assistant Examiner*—Peter C. English
*Attorney, Agent, or Firm*—Nixon & Vanderhye

[57] ABSTRACT

This invention provides a hydraulically driven crawler vehicle in which pilot pressure for controlling the discharge of right and left variable displacement pumps is produced in response to the engine speed by throttle valves disposed in the discharge oil circuit of a fixed displacement pump, variable throttle valve in a branch circuit each installed in a pilot circuit for controlling the right and left crawlers is operated by a cam rotated by the steering wheel, and when the steering wheel is turned exceeding a certain angle, a direction change-over solenoid valve of variable displacement pump at the steering wheel turning side is energized to the reverse side so that the right and left crawlers are driven in the reverse direction to each other. Also, this invention provides a hydraulically driven crawler vehicle in which the oil pressure to a swash plate angle control cylinder which changes the angle of swash plate in the variable displacement pump producing oil pressure to the motor for traveling is controlled by feeding back the actual angle of swash plate so that the angle of swash plate corresponds to the command pressure based on the engine speed.

5 Claims, 5 Drawing Sheets

FIG. 3

| STEERING CONDITION (DIRECTION AND DEGREE OF STEERING) | STATUS OF VARIABLE THROTTLE VALVE AND CAM | | REMARKS |
|---|---|---|---|
| | LEFT THROTTLE VALVE | RIGHT THROTTLE VALVE | |
| TO LEFT MAX<br>$\theta_1 = -(180° - \text{STOPPER})$ | | | PIVOT TURN<br>SW ON |
| TO LEFT LEVEL 3<br>$\theta_2 = \theta_1 \sim -90°$ | | | SW ON |
| TO LEFT LEVEL 2<br>$\theta_3 = -90°$ | | | LEFT VALVE FORWARD/REVERSE CHANGE (AUTOMATIC CHANGE OF SWITCH)<br>SW ON |
| TO LEFT LEVEL 1<br>$\theta_4 = -90° \sim 0°$ | | | SW OFF |
| STRAIGHT<br>$\theta_5 = 0$ | | | SW OFF |
| TO RIGHT LEVEL 1'<br>$\theta_6 = 0° \sim 90°$ | | | SW OFF |
| TO RIGHT LEVEL 2'<br>$\theta_7 = 90°$ | | | LEFT VALVE FORWARD/REVERSE CHANGE (AUTOMATIC CHANGE OF SWITCH)<br>SW ON |
| TO RIGHT LEVEL 3'<br>$\theta_8 = 90° - \theta$ | | | |
| TO RIGHT MAX<br>$\theta_9 = 180° - \text{STOPPER}$ | | | PIVOT TURN |

STEERING CONTROL FOR A HYDRAULICALLY DRIVEN CRAWLER VEHICLE

FIELD OF THE INVENTION AND RELATED ART STATEMENT

This invention relates to a hydraulically driven crawler vehicle that can maintain the vehicle speed even when the load is increased.

FIG. 5 is a diagrammatic view of a conventional hydraulically driven crawler vehicle such as a crawler dump vehicle.

In FIG. 5 showing a conventional hydraulically driven crawler vehicle, reference numeral 21 denotes an engine; 30 denotes a governor control lever for the engine 21; 22, 24 denote variable displacement pumps driven by the engine 21; 23, 25 denote swash plate angle control levers for the variable displacement pumps 22, 24; 28, 28 denote final reducers; and 29, 29 denote crawlers.

On this crawler vehicle, the quantity of oil discharged from the variable displacement pump 22, 24 is independently controlled by the governor control lever 30 for the engine 21 and the swash plate angle control levers 23, 25 for the variable displacement pumps 22, 24. The oil discharged from the variable displacement pumps 22, 24 drive motors for traveling 26, 27, the rotation of which is transferred to the right and left crawlers 29 via the right and left final reducers 28 to drive the crawlers 29.

This conventional hydraulically driven crawler vehicle has the following disadvantages:

The capacity of variable displacement pumps 22, 24 has been determined so as to accommodate engine horsepower when the output of engine 21 is maximum; as a result, when the swash plate angle control lever 23, 25 is operated so that the pump swash plate becomes maximum while the output of engine 21 is small (the engine speed is low), the engine stops.

Further, the operator must have considerable experience in the operation since the operations of straight traveling, gentle turning, stopping, skid turning, pivot turning, and forward/reverse changing are performed by the right and left levers independently.

Still further, when the body of operator is swayed by the vibration of vehicle body, he/she is apt to hold his/her body against the lever, so that an undesirable force is applied to the lever, which may let the vehicle run in an unexpected direction.

OBJECT AND SUMMARY OF THE INVENTION

Accordingly, an object of this invention is to provide a hydraulically driven crawler vehicle which allows adjustment of vehicle speed and turning radius, and pivot turning, causes no engine stop, operates while the operator holds his/her body, and maintains the resistance to environment.

Another object of this invention is to provide a hydraulically driven crawler vehicle whose speed is not decreased by the increase in the vehicle load.

To attain the above objects, the hydraulically driven crawler vehicle of this invention, which has a closed-circuit drive means with a variable displacement pump and a motor installed each for right and left crawlers independently, comprises a fixed displacement pump driven in a certain proportion to the revolution of engine output shaft, throttle valves disposed in the discharge oil circuit of the fixed displacement pump to produce pilot pressure for controlling the discharge of right and left variable displacement pumps in response to the engine speed, branch circuits disposed in the right and left pilot circuits for control, variable restrictors disposed in the branch circuits, and a cam mounted on the rotating shaft of steering wheel to control the variable restrictors, by which when the steering wheel is turned exceeding a certain angle, a direction change-over solenoid valve of variable displacement pump at the steering wheel turning side is energized to the reverse side so that the right and left crawlers are driven in the reverse direction to each other.

Also, to attain the above objects, the hydraulically driven crawler vehicle of this invention, which has a closed-circuit drive means with a variable displacement pump and a motor installed each for right and left crawlers independently, comprises a fixed displacement pump driven in a certain proportion to the revolution of the engine output shaft, throttle valves disposed in the discharge oil circuit of the fixed displacement pump to produce pilot pressure for controlling the discharge of right and left variable displacement pumps in response to the engine speed, branch circuits disposed in the right and left pilot circuits for control, variable restrictors disposed in the branch circuits, a cam mounted on the rotating shaft of steering wheel to control the variable restrictors, direction change-over solenoid valves for changing the direction of pilot pressure so as to reverse the discharge direction of the variable displacement pump when the steering wheel is turned exceeding a certain angle, whose discharge pressure is the command pressure, and feedback control valves which connect to the variable mechanisms of the variable discharge pumps and direct the discharge pressure of the fixed displacement pump to the variable mechanisms for the feedback control of the variable mechanisms in response to the command pressure.

The hydraulically driven crawler vehicle of this invention is configured as described above. Therefore, the pilot pressure for controlling the discharge of the right and left variable displacement pumps is produced in response to the engine speed by the throttle valves disposed in the discharge oil circuit of the fixed displacement pump. The variable throttle valve in the branch circuit disposed in each of the pilot circuits for controlling the right and left crawlers is operated by the cam rotated by the steering wheel. When the steering wheel is turned exceeding a certain angle, a direction change-over solenoid valve of variable displacement pump at the steering wheel turning side is energized to the reverse side so that the right and left crawlers are driven in the reverse direction to each other.

Also, the operation amount of displacement variable mechanism of variable displacement pump is fed back to the feedback control valve, and the oil pressure is supplied to the variable mechanism so that the displacement corresponds to the command pressure.

On the hydraulically driven crawler vehicles of this invention, the pilot pressure for controlling the discharge of the right and left variable displacement pumps is produced in response to the engine speed by the throttle valves disposed in the discharge oil circuit of the fixed displacement pump. The variable throttle valve in the branch circuits disposed in each of the pilot circuit for controlling the right and left crawlers is operated by the cam rotated by the steering wheel. When the steering wheel is turned exceeding a certain angle, a direction change-over solenoid valve of variable displacement pump at the steering wheel turning side is energized to the reverse side so that the right and left crawlers are driven in the reverse direction to each other. Thus, the control of vehicle speed and turning radius and the pivot turning can be performed by the accelerator and the steering wheel.

Also, the engine will not stop because control is carried out in such a manner that the horsepower which the pump accommodates does not exceed the output power of the engine.

The steering wheel type steering system is used, so that the operator can operate the vehicle while holding his/her body, and the resistance to environment can be maintained.

No implementation of electric control improves the resistance to environment.

Furthermore, the operation amount of variable displacement pump is detected, and the oil pressure to the swash plate angle control cylinder is controlled so as to obtain the operation amount corresponding to the command pressure, so that the vehicle speed will not decrease even when the vehicle load is increased.

BRIEF DESCRIPTION OF THE DRAWINGS

In the drawings,

FIG. 3 is a chart showing the status change of variable throttle valve and the rotational speed for the hydraulically driven crawler vehicle.

DETAILED DESCRIPTION OF PREFERRED EMBODIMENTS

Figure 1:
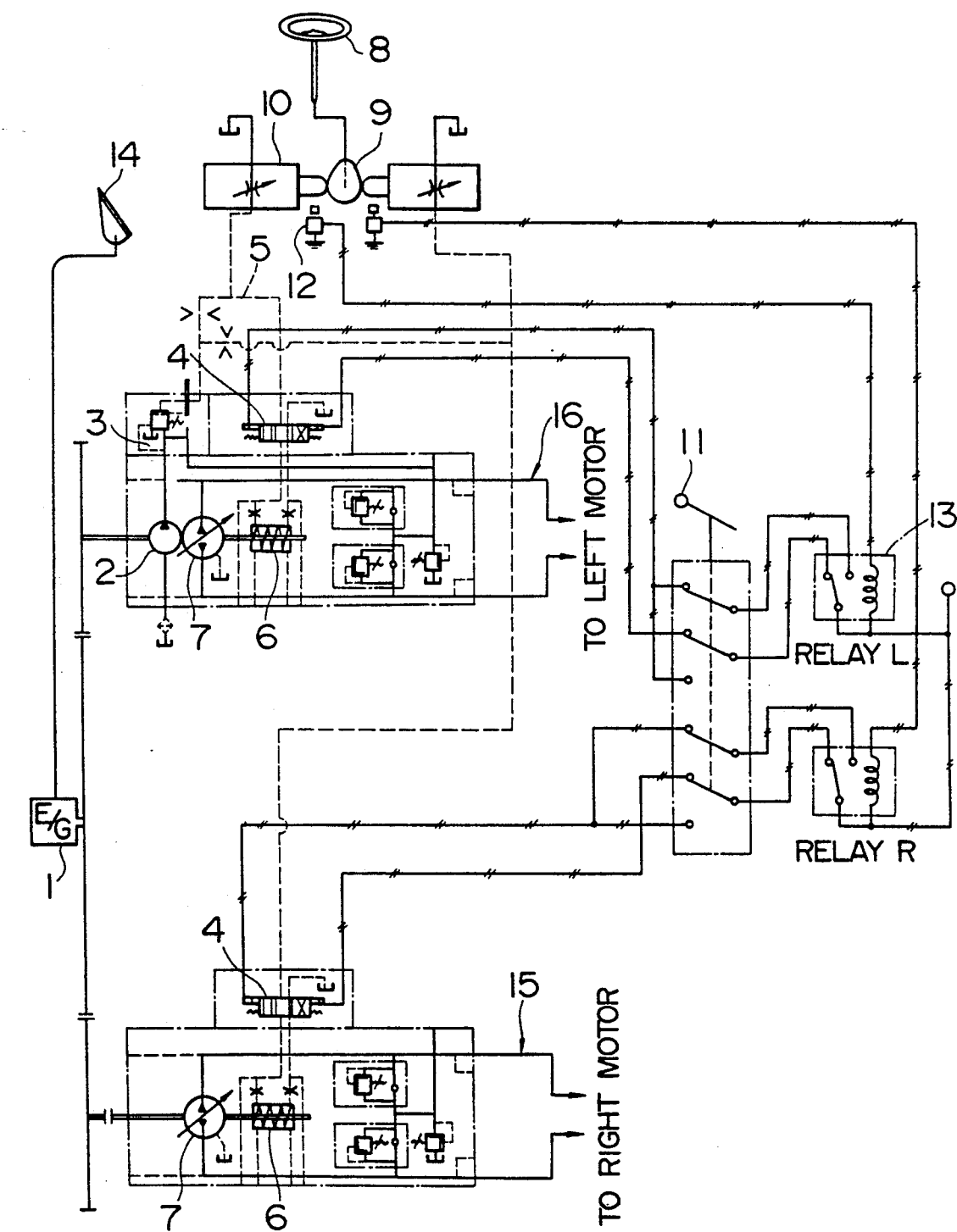
FIG. 1 is a diagrammatic view of an embodiment of hydraulically driven crawler vehicle according to this invention.

A hydraulically driven crawler vehicle according to this invention will be described by reference to an embodiment shown in FIG. 1. In FIG. 1, reference numeral 1 denotes an engine, 2 denotes a fixed displacement pump, 3 denotes a restrictor (fixed orifice), 4 denotes a direction change-over solenoid valve, 5 denotes a pilot pressure circuit for swash plate control, 6 denotes a swash plate angle control cylinder as a displacement changeable mechanism, 7 denotes a variable displacement pump, 8 denotes a steering wheel, 9 denotes a cam, 10 denotes a variable throttle valve (for left), 11 denotes a forward/reverse change-over switch lever (manual), 12 denotes a switch for pivot turning (for left), 13 denotes a relay for pivot turning, 14 denotes an accelerator (governor pedal), 15 denotes a pump main hydraulic circuit to a motor for traveling, and 16 denotes a pump main hydraulic circuit to a motor for traveling.

The capacity of the variable displacement pump 7 is controlled by the swash plate angle control cylinder 6. The oil pressure for control (pilot pressure) given to the swash plate angle control cylinder 6 is produced by the fixed displacement pump 2, which discharges a quantity of oil in proportion to the rotational speed of engine 1, and the fixed restrictor 3.

This pilot pressure can be selectively applied to either of two ports of the swash plate angle control cylinder 6 by means of the direction change-over solenoid valve 4, and the pressure can be reduced by draining oil through the manual variable throttle valve 10 via a branch circuit.

The control spool of the variable throttle valve 10 changes the degree of opening by rotating the cam 9 by means of the steering wheel 8 operated by the operator. The solenoid current which controls the direction change-over solenoid valve 4 is fed via the forward/reverse change-over switch lever 11 and the relay for pivot turning 13.

The energizing current for the relay for pivot turning 13 is supplied via the switch for pivot turning 12, and the relay for pivot turning 13 is operated when the steering wheel is turned over a certain angle. The switch for pivot turning 12 is operated by a cam (not shown) disposed on a shaft on which the cam 9, which presses the spool of the variable throttle valve 10, is disposed.

Next, the operation of the hydraulically driven crawler vehicle shown in FIG. 1 will be explained in detail. The oil flow discharged from the fixed displacement pump 2 is reduced by the fixed restrictor 3, producing a pilot pressure. This pilot pressure changes with the increase or decrease in the amount of oil passing through the restrictor (fixed orifice) 3. If the drive shaft of the fixed displacement pump 2 is connected to (or linked at a constant change gear ratio to) the output shaft of the engine 1, therefore, the pilot pressure changes in accordance with the engine speed.

This pilot pressure is supplied to the swash plate angle control cylinder 6 to control the right and left variable displacement pump 7.

As a result, when the rotational speed of the engine 1 is low and the output is low, the swash plate angle is small and the horsepower which the pump accommodates is small, so that the engine does not stop. When the rotational speed of the engine 1 is high and the output is high, the swash plate angle is large and the horsepower is effectively accommodated. Thus, the vehicle speed can be controlled merely by operating the accelerator 14.

When the vehicle is turned, a relative difference is given to the rotational speeds of the right and left motors for a crawler vehicle equipped with two pumps and two motors. When the right and left motors are rotated at the same speed, the vehicle runs straight. When the right and left motors are rotated in the same direction with a speed difference, the vehicle turns gently. When one motor is stopped, the vehicle turns promptly. When the right and left motors are rotated in the reverse direction, the vehicle turns pivotally.

Here, the skid turning means that the vehicle turns in such a manner that the trajectory of vehicle is a circle with the center at the crawler 29 at the side of stopped motor. The pivot turning means that the vehicle turns in such a manner that the trajectory of vehicle is a circle with the center at the transverse central position between the right and left crawlers 29.

On the hydraulically driven crawler vehicle of this invention, the pilot pressure supplied to the swash plate angle control cylinder 6 of the pump is discharged through the variable throttle valves 10 disposed separately for the right and the left, by which a difference is produced in the discharge between the right and left pumps for turning the vehicle.

Figure 2:
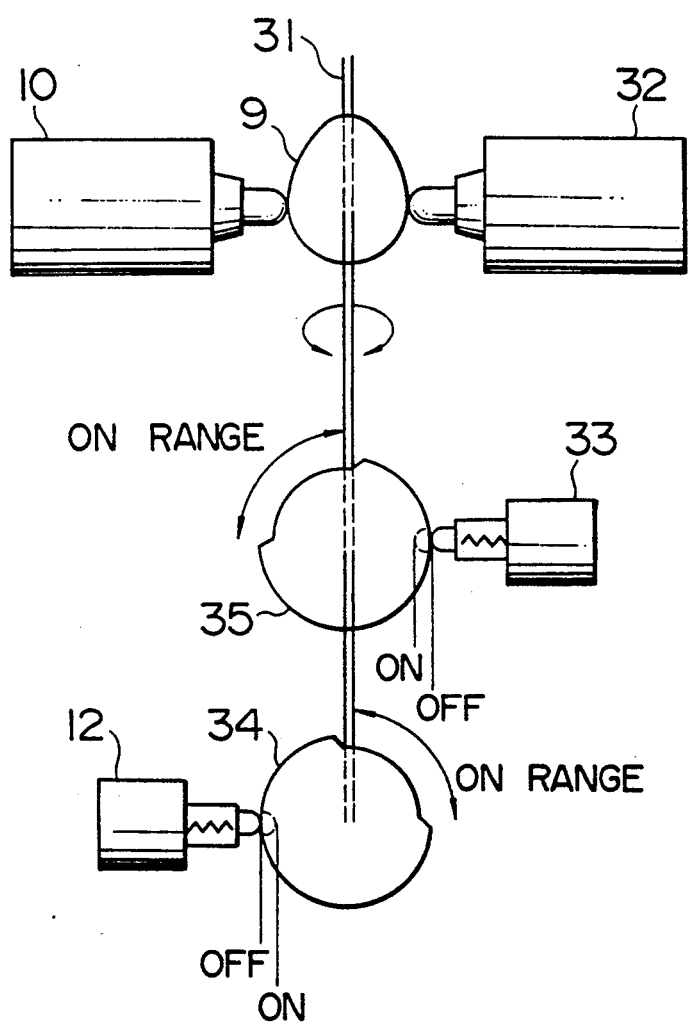
FIG. 2 is a sectional view showing a typical arrangement of steering cams and switch plates for the hydraulically driven crawler vehicle.

FIG. 2 shows an arrangement of switches for pivot turning, and FIG. 3 shows the status change of variable throttle valve 10 and the rotational speed of the crawler. When the steering shaft 31 is turned to the left, the left pilot pressure control throttle valve 10 is pressed by the cam 9, and is opened gradually, so that the pilot pressure at the left side is decreased. The pictures shown in the Remarks column indicate the case in which the forward/reverse change-over manual switch is in the forward position.

When the cam 9 is turned 90 degrees, the variable throttle valve 10 is fully opened, so that the pilot pressure at the left side becomes minimum, which stops the left crawler; the left skid turning of vehicle is performed. At this time, a cam plate for switch 33 fixed to the steering shaft 31 changes over the switch for left pivot turning 12. Therefore, the direction change-over solenoid valve 4 of the left variable displacement pump 7 is energized to the reverse crawler side, and the flow direction of oil in the main hydraulic circuit 15, 16 of the left variable displacement pump 7 is reversed.

When the steering shaft 31 is further turned, the pilot pressure is increased with the flow direction remaining reverse.

When the steering shaft is turned to the 180° position, the pilot pressure returns to the condition in which almost no oil is discharged from the throttle valve, so that the left motor rotates at nearly the same speed as the right motor in the reverse direction, causing pivot turning.

For right-side turning, the operation is reverse to the above operation. In FIG. 2, reference numeral 32 denotes a variable throttle valve, 33 denotes a switch for right pivot turning, and 34 denotes a cam plate for switch fixed to the steering shaft 31.

In the embodiment described above, the pilot pressure from the direction change-over solenoid valve 4 is supplied to the swash plate angle control cylinder 6 as it is, so that the swash plate angle control cylinder 6 is subjected to a reaction force which the main hydraulic circuit receives. When the vehicle load is increased, therefore, its reaction force presses back the swash plate of the swash plate angle control cylinder 6, so that the vehicle speed decreases despite the presence of swash plate angle command pressure (pilot pressure) determined by the engine speed.

Figure 4:
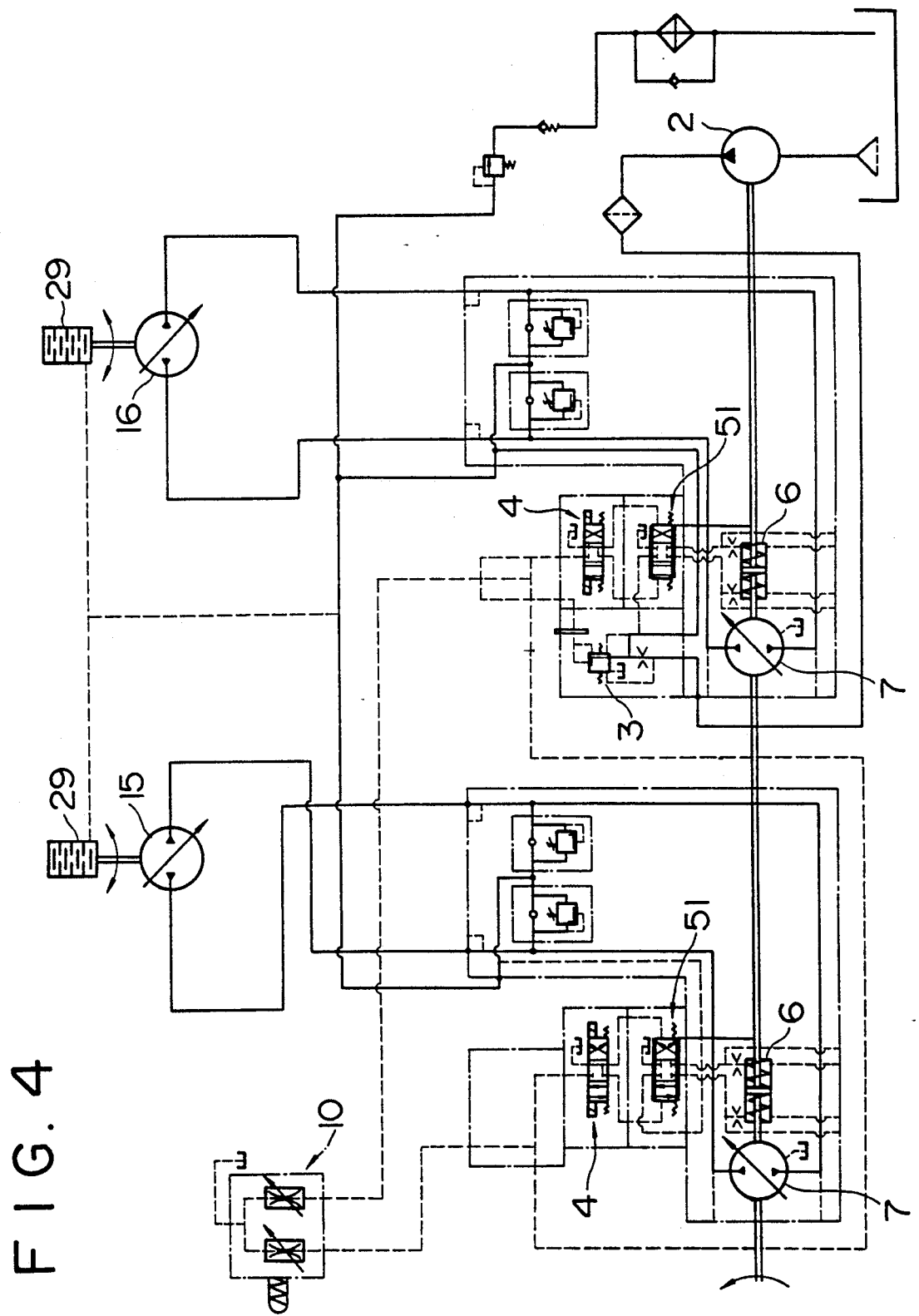
FIG. 4 is a diagrammatic view of another embodiment of hydraulically driven crawler vehicle according to this invention.
Figure 5:
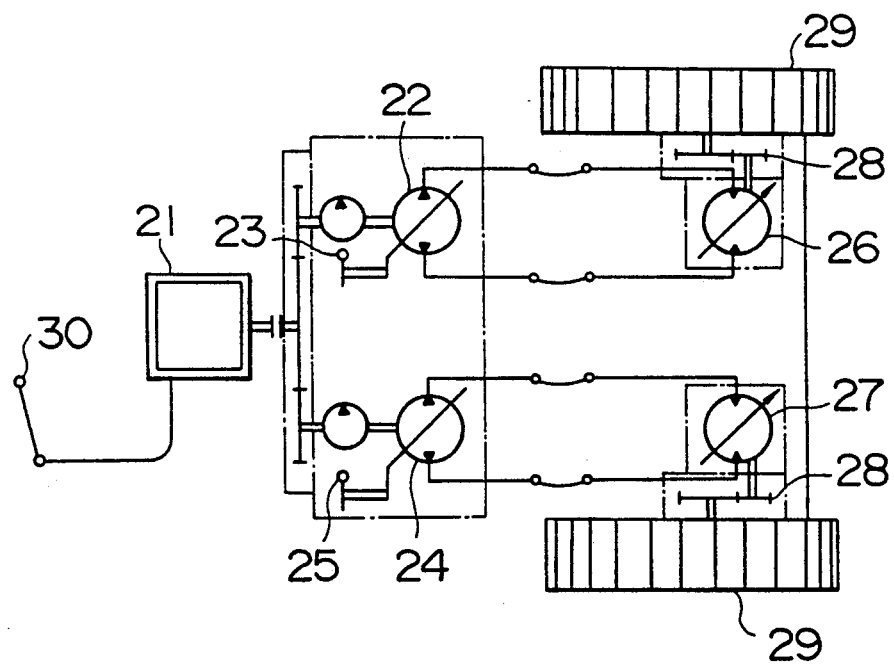
FIG. 5 is a diagrammatic view of a conventional hydraulically driven crawler vehicle.

To solve this problem, the operation amount of the swash plate angle control cylinder 6 is actually detected, and the swash plate angle control cylinder 6 is controlled so that the swash plate can be maintained in response to the swash plate angle command pressure. An embodiment of this configuration is shown in FIG. 4.

In the embodiment of hydraulically driven crawler vehicle, the pilot pressure changed over by the direction change-over solenoid valve 4 is not used as an operating pressure for the swash plate angle control cylinder 6, but is used as the command pressure for a feedback control valve 51. The feedback control valve 51 is mechanically connected to the piston or the like of the swash plate angle control cylinder 6. It controls the supply of oil pressure to the swash plate angle control cylinder 6, so that the swash plate angle corresponding to the command pressure can be obtained.

The pressure of oil discharged from the fixed displacement pump 2 is used as the operating pressure of the swash plate angle control cylinder 6 in which the direction is changed over by the direction change-over solenoid valve 4 and the oil supplied to and discharged from which is controlled by the feedback control valve 51.

Therefore, for example, even when the load of crawler vehicle is increased and the increase in the pressure of main hydraulic circuit presses back the swash plate of the variable displacement pump 7, the oil pressure is added to the swash plate angle control cylinder 6 so that the angle of swash plate detected by the piston position of the swash plate angle control cylinder 6 is an angle determined by the command pressure, and the variable displacement pump 7 maintains a discharge corresponding to the command pressure; therefore, the vehicle speed does not decrease.

The explanation of the hydraulic circuit shown in FIG. 4 is omitted because this circuit is the same as that shown in FIG. 1 except for the change-over solenoid valve 4 and the feedback control valve 51 according to this invention.

We claim:

1. A hydraulically driven crawler vehicle which has a closed-circuit drive means with both a variable displacement pump and a motor installed for each of right and left crawlers independently, said right and left motors controlled by right and left pilot circuits, respectively, said vehicle further including an engine with an output shaft, and a steering wheel for control of said vehicle, the hydraulically driven crawler vehicle comprising:

a fixed displacement pump driven in a certain proportion to the revolution of said engine output shaft, said fixed displacement pump having a discharge oil circuit, throttle valves disposed in said discharge oil circuit of said fixed displacement pump to produce pilot pressure for controlling the discharge of said right and left variable displacement pumps in response to the engine speed, branch circuits disposed in said right and left pilot circuits for control, variable restrictors disposed in said branch circuits, a steering cam mounted on the rotating shaft of said steering wheel to control said variable restrictors, a direction reversal cam, responsive to said steering wheel; and a direction change-over solenoid valve associated with each of said variable displacement pumps, operated by said direction reversal cam in response to said steering wheel being turned exceeding a predetermined angle, is energized to a reverse position so that the right and left crawlers are driven in the reverse direction to each other.

2. A hydraulically driven crawler vehicle which has a closed-circuit drive means with both a variable displacement pump and a motor installed for each of right and left crawlers independently, said right and left motors controlled by right and left pilot circuits, respectively, said vehicle further including an engine with an output shaft, and a steering wheel for control of said vehicle, the hydraulically driven crawler vehicle comprising:

a fixed displacement pump driven in a certain proportion to the revolution of said engine output shaft, said fixed displacement pump having a discharge oil circuit, throttle valves disposed in said discharge oil circuit of said fixed displacement pump to produce pilot pressure for controlling the discharge of said right and left variable displacement pumps in response to the engine speed, branch circuits disposed in said right and left pilot circuits for control, variable restrictors disposed in said branch circuits, a steering cam mounted on the rotating shaft of said steering wheel to control said variable restrictors, a direction reversal cam responsive to said steering wheel;

direction change-over solenoid valves, responsive to said direction reversal cam and said steering wheel turning beyond a certain angle, for changing the direction of pilot pressure so as to reverse the discharge direction of one of said variable displacement pumps whose discharge pressure is a command pressure, and feedback control valves which connect to said variable displacement pumps and direct the discharge oil circuit of said fixed displacement pump to said variable displacement pumps in response to the command pressure.

3. A steering system for a hydraulically driven crawler vehicle, said crawler vehicle having left and right crawler tracks, each of said tracks driven by a hydraulic motor, each motor responsive to a respective variable displacement pump, said vehicle including an engine for driving a fixed displacement pump displacing a fixed amount of hydraulic fluid in proportion to the engine speed, said steering apparatus comprising:

a steering wheel controlled by an operator of said crawler vehicle;

left and right throttle valves for controlling said respective left and right crawler variable displacement pumps;

steering cam means, responsive to said steering wheel position, for actuating one or the other of said left and right throttle valves depending upon whether said steering wheel is turned towards the left or right;

each of said left and right variable displacement pumps including a respective direction change-over solenoid valve responsive to an electrical control signal; and a direction reversal cam means, responsive to said steering wheel and in particular responsive to said steering wheel being turned beyond a predetermined angle, for causing one of said left or right direction change-over solenoid valves to reverse the direction of operation of one of said left or right crawler motors.

4. A steering system for a hydraulically driven crawler vehicle according to claim 3, wherein said direction reversal cam means includes:

left and right reversal switches for providing an electronic control signal upon actuation; and a direction reversal cam, connected to said steering wheel, for actuating one of said left and right reversal switches when said steering wheel is turned beyond said predetermined angle.

5. A steering system for a hydraulically driven crawler vehicle according to claim 3, wherein said steering cam means comprises a steering cam, mechanically connected to said steering wheel and mounted for rotation in conjunction with said steering wheel, and said left and right throttle valves are mounted adjacent said steering cam and actuated directly thereby.

* * * * *